United States Patent
Matsushiro et al.

(10) Patent No.: US 6,924,618 B2
(45) Date of Patent: Aug. 2, 2005

(54) INVERTER CONTROLLER FOR DRIVING MOTOR, AND AIR CONDITIONER

(75) Inventors: Hideo Matsushiro, Kusatsu (JP); Tomohiro Sugimoto, Kusatsu (JP); Mitsuo Kawaji, Sakata-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/807,231

(22) Filed: Mar. 24, 2004

(65) Prior Publication Data

US 2004/0207360 A1 Oct. 21, 2004

(30) Foreign Application Priority Data

Mar. 25, 2003 (JP) ......................................... 2003-082415

(51) Int. Cl.[7] .............................................. H02P 5/28
(52) U.S. Cl. ...................... 318/811; 318/800; 318/803; 318/806; 318/812; 318/817
(58) Field of Search ................................. 318/800, 803, 318/806, 811, 812, 817

(56) References Cited

U.S. PATENT DOCUMENTS

| | | | | |
|---|---|---|---|---|
| 4,992,718 A | * | 2/1991 | Kumaki ...................... 318/768 |
| 5,206,575 A | * | 4/1993 | Nakamura et al. ........... 318/807 |
| 5,457,375 A | * | 10/1995 | Marcinkiewicz et al. ... 318/802 |
| 5,561,595 A | * | 10/1996 | Smith ........................... 363/37 |
| 5,614,803 A | * | 3/1997 | Morioka et al. ............. 318/801 |
| 5,852,551 A | * | 12/1998 | Lee ............................... 363/39 |
| 6,002,218 A | * | 12/1999 | Toda et al. .................... 318/66 |
| 6,191,545 B1 | * | 2/2001 | Kawabata et al. ........... 318/439 |
| 6,229,278 B1 | * | 5/2001 | Garces et al. ................ 318/801 |
| 6,337,548 B2 | * | 1/2002 | Kawabata et al. ........... 318/439 |
| 6,414,455 B1 | * | 7/2002 | Watson ......................... 318/432 |
| 6,489,692 B1 | * | 12/2002 | Gilbreth et al. ............... 290/52 |
| 6,512,341 B2 | * | 1/2003 | Matsushiro et al. ......... 318/254 |
| 6,751,105 B2 | * | 6/2004 | Yamanaka et al. ............ 363/41 |
| 6,819,078 B2 | * | 11/2004 | Ho .............................. 318/808 |
| 6,822,417 B2 | * | 11/2004 | Kawaji et al. ............... 318/701 |
| 2004/0124807 A1 | * | 7/2004 | Nakata et al. ............... 318/801 |
| 2004/0207360 A1 | * | 10/2004 | Matsushiro et al. ......... 318/811 |
| 2004/0228151 A1 | * | 11/2004 | Matsushiro et al. .......... 363/37 |
| 2004/0232876 A1 | * | 11/2004 | Matsushiro et al. ......... 318/801 |
| 2004/0232877 A1 | * | 11/2004 | Kawaji et al. ............... 318/802 |
| 2004/0246641 A1 | * | 12/2004 | Sugimoto et al. ........... 361/91.1 |
| 2005/0007061 A1 | * | 1/2005 | Hofmann et al. ............ 318/701 |

FOREIGN PATENT DOCUMENTS

| | | | |
|---|---|---|---|
| JP | 9-266674 | 10/1997 | |
| JP | 11308894 A | * 11/1999 | ............. H02P/7/63 |
| WO | WO 3081765 A1 | * 10/2003 | ........... H02P/21/00 |

* cited by examiner

*Primary Examiner*—David Martin
*Assistant Examiner*—Patrick Miller
(74) *Attorney, Agent, or Firm*—Wenderoth, Lind & Ponack, L.L.P.

(57) ABSTRACT

An inverter controller for driving a motor includes a rectifier having a reactor, an inverter, a capacitor, a generator which generates a voltage command value for each phase of the motor, a detector which detects a DC voltage between the DC buses of the inverter, a first corrector which calculates a voltage correction coefficient by comparing the DC voltage with a predetermined DC reference voltage, a second corrector which corrects the voltage command value by multiplying the voltage command value and the voltage correction coefficient, a selector which selects either two-phase modulation or three-phase modulation as a modulation type, a computer that computes a carrier frequency, and a pulse width modulation controller which controls a pulse width modulation so that a value of a voltage to be applied to the motor equals to the corrected voltage command value, by using the selected modulation type and the selected carrier frequency.

11 Claims, 17 Drawing Sheets

INVERTER CONTROLLER FOR DRIVING MOTOR, AND AIR CONDITIONER

BACKGROUND OF THE INVENTION

1. Field of the Invention

The present invention relates to an inverter controller for driving a motor, and an air conditioner using it.

2. Description of the Related Art

FIG. 16 shows a general configuration of an inverter controller for driving a motor, used in general-purpose inverter or the like. As shown in FIG. 16, an inverter controller 100 for driving a motor includes a main circuit 102 and a control circuit 104. The main circuit 102 includes a DC power supply unit 106 and an inverter 108. The inverter 108 is connected to a motor 110. The DC power supply unit 106 includes an AC power source 112, a rectifier 114, a reactor 116 and a smoothing capacitor 118. The reactor 116 is a reactor for power factor correction which corrects a power factor of the AC power source 112. The smoothing capacitor 118 accumulates electric energy as a DC voltage source for the inverter 108.

On the other hand, the control circuit 104 includes a motor voltage command generator 120 and a pulse width modulation (PWM) controller 122. The motor voltage command generator 120 generates a voltage command value for each phase of the motor 110 on the basis of a motor speed command value ω* received from outside of the inverter controller. The PWM controller 122 generates PWM signals for the inverter 108 on the basis of the voltage command value for each phase of the motor 110 generated by the motor voltage command generator 120.

FIG. 17 is a graph to explain a relation between harmonic components of the AC power source current (indicated by current values) and the degree of the harmonic components relative to the AC power source frequency in the inverter controller 100 shown in FIG. 16. Here, an output voltage of the AC power source 112 is 220 V (AC power source frequency is 50 Hz), a power input to the inverter 108 is 1.5 kW, and a capacitance of the smoothing capacitor 118 is 1500 μF. In FIG. 17, the graph indicated by broken line refers to the relation when the reactor 116 has an inductance value of 5 mH, and the graph indicated by single dot chain line refers to the relation when it has an inductance value of 20 mH. The graph indicated by solid line refers to the standard of IEC (International Electrotechnical Commission). As shown in FIG. 17, when the reactor 116 has an inductance value of 5 mH, the third harmonic component largely exceeds the IEC standard. While, when it has the inductance value of 20 mH, the harmonic components up to the degree of 40 are below the IEC standard; the harmonic components up to the degree of 40 satisfy the IEC standard.

As indicated above, in order to satisfy the IEC standard when a load is high, in particular, the inductance value of the reactor 116 for power factor correction must be further increased. However, this brings about problems in that the inverter controller becomes increased in size and in weight, and its cost is also increased.

Accordingly, a DC power supply unit has proposed in which an increase of an inductance value of a reactor for power factor correction is suppressed, while the harmonic components of the AC power source current are reduced, and its power factor is high (for example, refer to JP laid-open patent publication No. 9-266674 (1997)).

FIG. 18 is a circuit diagram of such a DC power supply unit. In this DC power supply unit, an AC voltage Vin of an AC power source is applied to AC input terminals of a full-wave rectifier consisting of bridge-connected diodes D1 to D4, the output current of the full-wave rectifier is charged into an intermediate capacitor C by way of a reactor Lin, and an electric charge of this intermediate capacitor C is discharged into a smoothing capacitor CD, and a DC voltage is applied to a load resistance RL. This DC power supply unit further includes a transistor Q1, and a base drive circuit G1 for driving this transistor Q1. The transistor Q1 is connected to positive and negative DC current paths between the full-wave rectifier and the intermediate capacitor C, at the load side of the reactor Lin.

The DC power supply unit further includes pulse generation circuits I1 and I2 for applying a pulse voltage to the base drive circuit G1, and a dummy resistor Rdm. Each of the pulse generation circuits I1 and I2 has a circuit for detecting a zero cross point of the AC power source voltage, and a circuit for continuing to supply a pulse current to the dummy resistor Rdm from the time of detection of the zero cross point to the time when a momentary value of the AC power source voltage becomes equal to a voltage across ends of the intermediate capacitor C.

Here, the pulse generation circuit I1 generates a pulse voltage in first half of half cycle of the AC supply voltage, and the pulse generation circuit I2 generates a pulse voltage in second half of half cycle of the AC supply voltage.

When supplying a current forcibly to the reactor Lin by turning on the transistor Q1, a back flow prevention diode D5 is arranged so that the electric charge in the intermediate capacitor C may not be discharged through the transistor Q1, and further a back flow prevention diode D6 and a reactor Ldc for enhancing a smoothing effect are connected in series in the path used in discharging the electric charge of the intermediate capacitor C into the smoothing capacitor CD.

According to above-mentioned configuration, reduction of the harmonic components and heightening of the power factor can be achieved while preventing the device size from increasing, by turning on the transistor Q1 in part or all of a phase interval in which the momentary value of the AC power source voltage does not exceed the voltage across the ends of the intermediate capacitor C.

However, the conventional configuration as disclosed in, for example, JP Laid-open Patent Publication No. 9-266674 (1997) still requires the smoothing capacitor CD with a large capacitance, and the reactor Lin with a large inductance (JP Laid-open Patent Publication No. 9-266674 discloses results of simulation in the case of the smoothing capacitor CD's capacitance of 1500 μF and the reactor Lin's inductance of 6.2 mH) . Also it also includes the intermediate capacitor C, the transistor Q1, the base drive circuit G1, the pulse generation circuits I1 and I2, the dummy resistor Rdm, the back flow prevention diodes D5 and D6, and the reactor Ldc, so that it causes the DC power supply unit to become large in size, to need many parts and to rise in cost.

SUMMARY OF THE INVENTION

It is an object of the present invention to provide an inverter controller for driving a motor which is small in size, light in weight, and low in cost.

In order to achieve this object, an inverter controller for driving a motor includes a rectifier connected to an AC power source, which includes a diode bridge and a reactor, having a predetermined inductance, connected to an input or an output side of the diode bridge, an inverter which converts a DC power received from the rectifier into an AC power to supply the AC power to the motor, a capacitor which has a predetermined capacitance, the capacitor being connected between DC buses of the inverter, a generator which generates a voltage command value for each phase of the motor on the basis of a motor speed command value received from outside of the inverter controller, a detector which detects a DC voltage between the DC buses of the inverter, a first corrector which calculates a voltage correction coefficient by comparing the DC voltage received from the detector with a predetermined DC reference voltage, a second corrector which corrects the voltage command value for each phase of the motor by multiplying the voltage command value and the voltage correction coefficient, a selector which selects either two-phase modulation or three-phase modulation as a modulation type used in pulse width modulation control of the inverter, a computer that computes a carrier frequency used in the pulse width modulation control of the inverter, and a pulse width modulation controller which controls a pulse width modulation so that a value of a voltage to be applied to the motor equals to the voltage command value corrected by the second corrector by using the modulation type selected by the selector and the carrier frequency computed by the computer.

An advantage of the inverter controller for driving a motor according to the present invention is that it is small in size, light in weight and low in cost.

Preferably, the inverter controller according to the present invention further includes an overvoltage protector connected in parallel to the capacitor, and the selector switches between the two-phase modulation and the three-phase modulation on the basis of the motor speed command value received from outside of the inverter controller.

An advantage of this inverter controller for driving a motor is that an operating region of a motor can be kept large, even if the operating voltage of the overvoltage protector fluctuates.

Preferably, the inverter controller according to the present invention further includes an overvoltage protector connected in parallel to the capacitor, and the computer changes the carrier frequency on the basis of the motor speed command value received from outside of the inverter controller.

An advantage of this inverter controller for driving a motor is that an operating region of a motor can be kept large, even if the operating voltage of the overvoltage protector fluctuates.

Preferably, the inverter controller according to the present invention further includes an overvoltage protector connected in parallel to the capacitor, and the selector switches between the two-phase modulation and the three-phase modulation on the basis of the DC voltage received from the detector.

An advantage of this inverter controller for driving a motor is that an operating region of a motor can be kept large, even if the operating voltage of the overvoltage protector fluctuates.

Preferably, the inverter controller according to the present invention further includes an overvoltage protector connected in parallel to the capacitor, and the computer changes the carrier frequency on the basis of the DC voltage received from the detector.

An advantage of this inverter controller for driving a motor is that an operating region of a motor can be kept large, even if the operating voltage of the overvoltage protector fluctuates.

Preferably, in the inverter controller according to the present invention, an operating frequency of the inverter is prevented from being stationary fixed at a resonance frequency, which is an even number multiple of an AC power source frequency, and within a range of predetermined frequency region around the resonance frequency.

An advantage of this inverter controller for driving a motor is that it can make the driving of the motor stable by avoiding the resonance phenomenon determined by the inverter frequency and the AC power source frequency.

Preferably, in the inverter controller according to the present invention, a combination of an inductance value of the reactor and a capacitance value of the capacitor is determined so that a resonance frequency determined by the inductance value and the capacitance value is larger than 40 times an AC power source frequency.

An advantage of this inverter controller for driving a motor is that it can suppress the harmonic components of AC power source current, and allows the IEC standard to be satisfied.

BRIEF DESCRIPTION OF THE DRAWING

Additional objects and advantages of the present invention will be apparent from the following detailed description of preferred embodiments thereof, which are best understood with reference to the accompanying drawings.

DETAILED DESCRIPTION OF THE PREFERRED EMBODIMENTS

The following is a detailed description of main embodiments of the invention, with reference to the drawings in which the same numerical references designate the corresponding elements throughout the different drawings.

Figure 1:
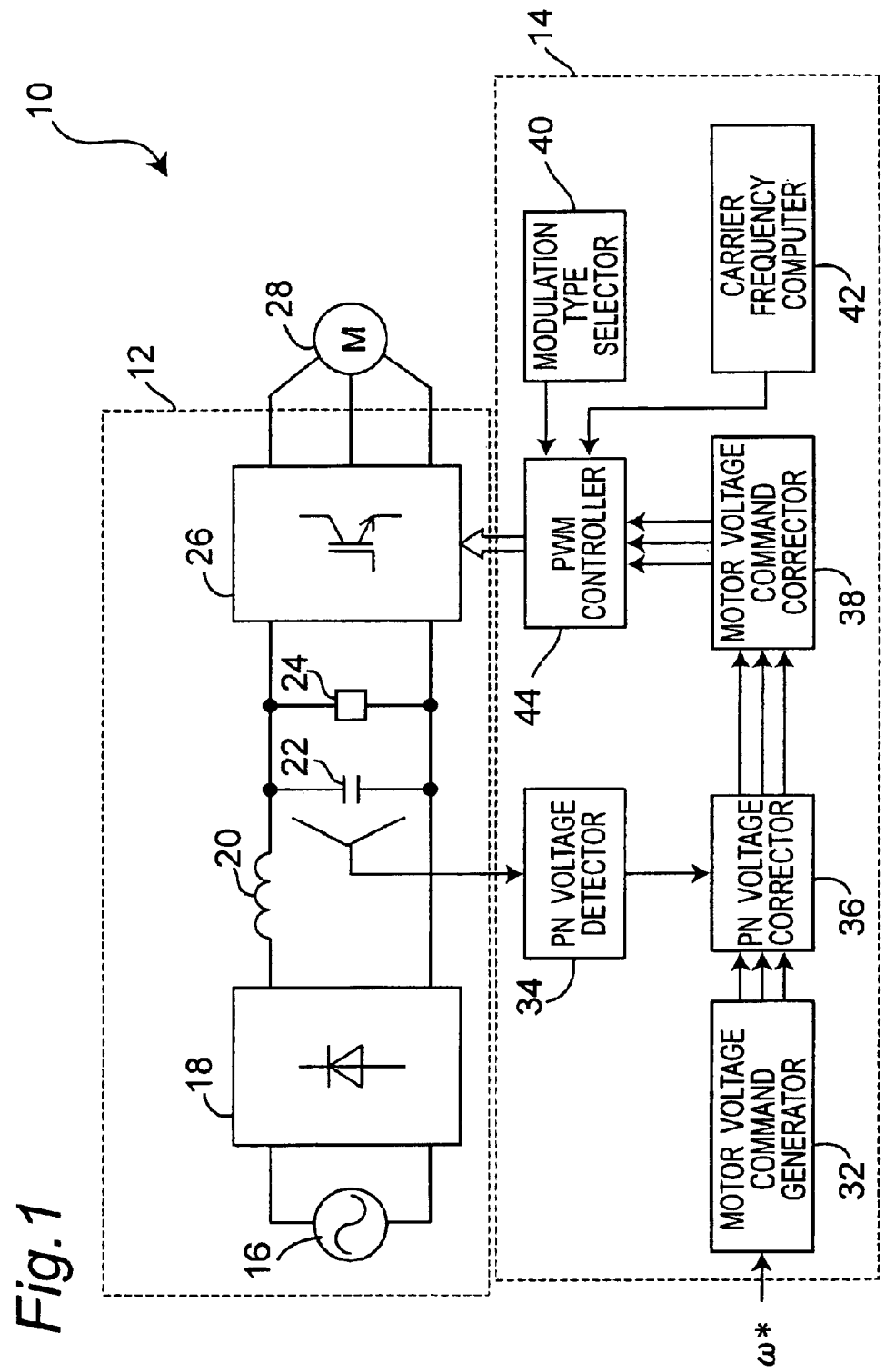
FIG. 1 is a diagram of an inverter controller for driving a motor according to a first embodiment of the present invention.

FIG. 1 shows a configuration of an inverter controller for driving a motor according to a first embodiment of the present invention. As shown in FIG. 1, an inverter controller 10 according to this embodiment includes a main circuit 12 and a control circuit 14. The main circuit 12 includes an AC power source 16, a diode bridge 18, a reactor 20 having a small inductance of 2 mH or less, a capacitor 22 having a small capacitance of of 100 μF or less, an overvoltage protector 24 and an inverter 26. The inverter 26 is connected to a motor 28. The diode bridge 18 converts an AC power received from the AC power source 16 into a DC power. The inverter 26 converts the DC power into an AC power. The motor 28 is driven by the AC power output by the inverter 26. The capacitor 22 absorbs the regenerative energy from the motor 28. The overvoltage protector 24 is connected in parallel to the capacitor 22.

On the other hand, the control circuit 14 includes a motor voltage command generator 32, a PN voltage detector 34, a PN voltage corrector 36, a motor voltage command corrector 38, a modulation type selector 40, a carrier frequency computer 42 and a PWM controller 44. The motor voltage command generator 32 generates a voltage command value for each phase of the motor 28 on the basis of a motor speed command value ω* received from outside of the inverter controller 10. The PN voltage detector 34 detects a DC voltage between DC buses (P-N) of the inverter 26 (referred to as "a PN voltage"). The PN voltage corrector 36 calculates a PN voltage correction coefficient by dividing a value of a predetermined DC reference voltage by a value of the PN voltage received from the PN voltage detector 34. Here, when the value of the PN voltage is zero or less, a predetermined maximum value of the PN voltage correction coefficient is set as the PN voltage correction coefficient. The motor voltage command corrector 38 corrects the voltage command value output from the motor voltage command generator 32 by multiplying the voltage command value and the PN voltage correction coefficient received from the PN voltage corrector 36. The modulation type selector 40 selects either two-phase modulation or three-phase modulation as the modulation type used in PWM control of the inverter 26. The carrier frequency computer 42 computes carrier frequency (that is, switching frequency of switching devices in the inverter 26) used in the PWM control of the inverter 26. The PWM controller 44 generates a PWM signal for the inverter 26 so that a value of the voltage applied to the motor 28 may be equal to the corrected voltage command value received from the motor voltage command corrector 38, by using the modulation type selected by the modulation type selector 40 and the carrier frequency computed by the carrier frequency computer 42.

An operation of the inverter controller 10 will be described below. The motor voltage command generator 32 generates the voltage command values $V_u^*$, $V_v^*$, $V_w^*$ for three phases of the motor 28, which are given by Eqs. (1).

$V_u^* = V_m \sin \theta_1$, $V_v^* = V_m \sin(\theta_1 - 2\pi/3)$, $V_w^* = V_m \sin(\theta_1 + 2\pi/3)$, (1)

where $V_m$ is a value of a voltage applied to the motor 28 (that is, a motor voltage). $\theta_1$ is calculated by time integration of the motor speed command value ω* as given by Eqs. (2).

$\theta_1 = \int \omega^* dt$. (2)

Figure 2:
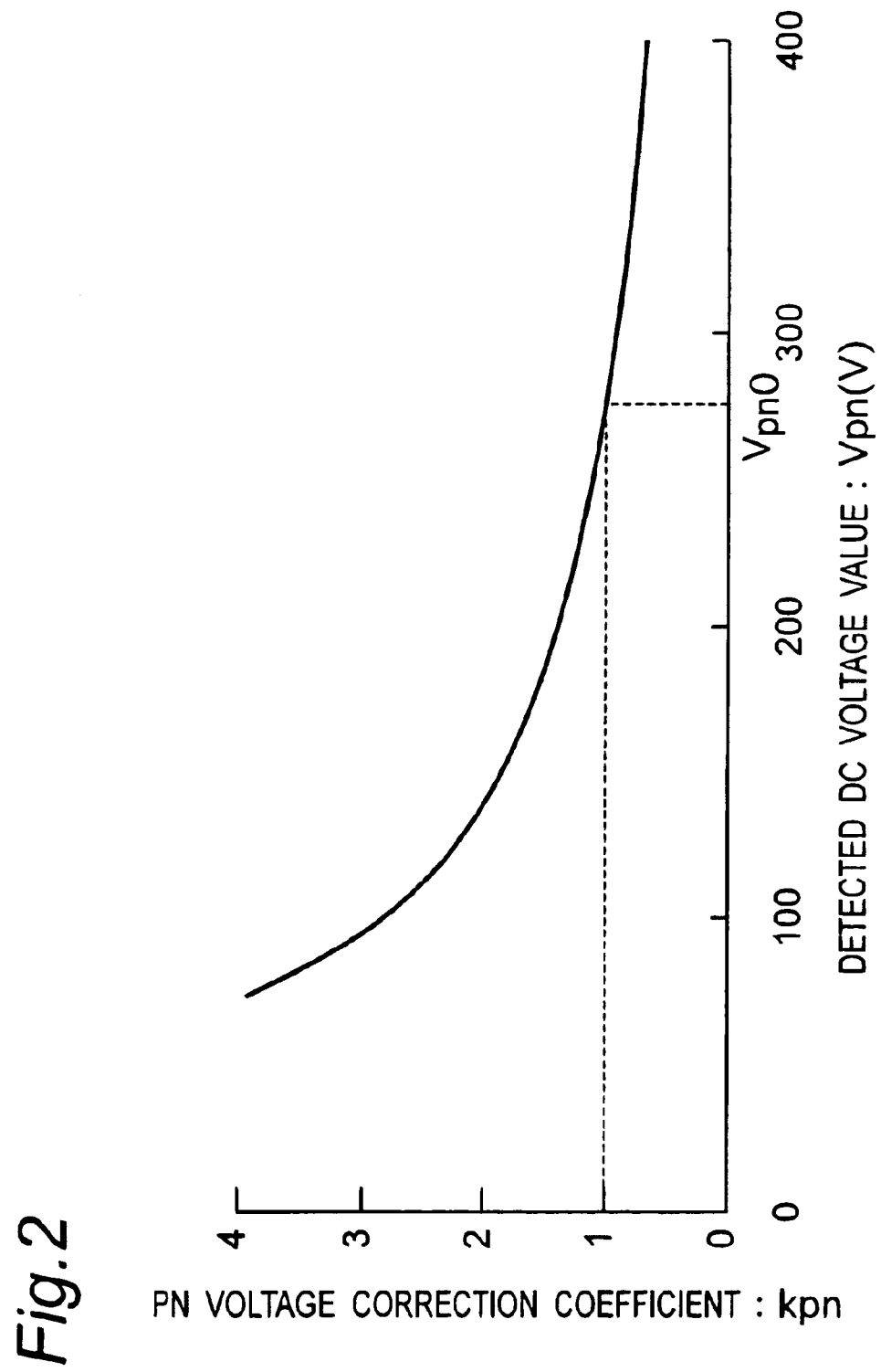
FIG. 2 is a diagram to explain a method of calculating a PN voltage correction coefficient in the inverter controller of FIG. 1.

FIG. 2 is a graph to explain a method of calculating the PN voltage correction coefficient by the PN voltage corrector 36. This graph shows the relation between the DC voltage detected by the PN voltage detector 34 and the PN voltage correction coefficient calculated by the PN voltage corrector 36. As shown in FIG. 2, the horizontal axis of the graph denotes the detected DC voltage value $V_{pn}$ and the vertical axis of it denotes the PN voltage correction coefficient $k_{pn}$. The PN voltage corrector 36 calculates the PN voltage correction coefficient $k_{pn}$, by using the predetermined DC reference voltage value $V_{pn0}$ and the detected DC voltage value $V_{pn}$ received from the PN voltage detector 34, as shown by Eqs. (3).

$$k_{pn} = \frac{V_{pn0}}{V_{pn} + \delta_0}. \quad (3)$$

Here, the detected DC voltage value $V_{pn}$ may be possibly zero because the inverter controller 10 according to this embodiment employs the capacitor 22 having a small capacitance. Thus, an infinitesimal term $\delta_0$ must be provided in order to avoid a divide-by-zero.

It is also possible to avoid the divide-by-zero by setting a predetermined maximum value of the PN voltage correction coefficient as the PN voltage correction coefficient $k_{pn}$, instead of using the infinitesimal term $\delta_0$ as shown in Eqs. (3), when the detected DC voltage value $V_{pn}$ is zero or less. That is, the PN voltage correction coefficient $k_{pn}$ may be calculated by Eqs. (4).

$$k_{pn} = \begin{cases} K_{pn\_max} & (V_{pn} \leq 0) \\ V_{pn0}/V_{pn} & (V_{pn} > 0), \end{cases} \quad (4)$$

where $K_{pn\_max}$ is the predetermined maximum value of the PN voltage correction coefficient.

The motor voltage command corrector 38 calculates corrected motor voltage command values $V_{uh}^*$, $V_{vh}^*$, $V_{wh}^*$ by using the voltage command values $V_u^*$, $V_v^*$, $V_w^*$ and the PN voltage correction coefficient $k_{pn}$, as shown by Eqs. (5).

$V_{uh}^* = k_{pn} \cdot V_u^*$, $V_{vh}^* = k_{pn} \cdot V_v^*$, $V_{wh}^* = k_{pn} \cdot V_w^*$. (5)

The modulation type selector 40 selects either two-phase modulation or three-phase modulation as the modulation type used in the PWM control of the inverter 26. The carrier frequency computer 42 selects the carrier frequency used in the PWM control of the inverter 26. The PWM controller 44 generates a PWM signal for the inverter 26 so that the corrected motor voltage command value received from the motor voltage command corrector 38 may be equal to a value of the voltage applied to the motor 28, by using the modulation type selected by the modulation type selector 40 and the carrier frequency selected by the carrier frequency computer 42.

According to the inverter controller for driving a motor of this embodiment, a voltage applied to a motor is kept almost constant, even if a PN voltage (that is, a DC voltage of an inverter) is largely varied, because the inverter controller corrects a motor voltage command value for each phase of a motor by multiplying the motor voltage command value generated by the motor voltage command generator and the PN voltage correction coefficient produced by the PN voltage corrector. As a result, a smoothing capacitor having a large capacitance is not needed, and a smoothing capacitor having a small capacitance can be used. Further, by using the capacitor having a small capacitance, current is always supplied to the motor, so that the power factor of the current supplied to the motor is raised. As a result, a reactor having a large capacitance is not needed, and hence a reactor having a small capacitance can be used.

Therefore, the inverter controller for driving a motor according to this embodiment can drive the motor even in the situation in which a well-known inverter controller could have been difficult or impossible to drive the motor due to large fluctuations in the DC voltage of the inverter. Further, the inverter controller for driving a motor according to this embodiment can realize an inverter controller of small size, light weight and low cost by using the reactor having a small capacitance and the capacitor having a small capacitance.

Further, the inverter controller for driving a motor according to this embodiment includes the modulation type selector and the carrier frequency computer, so that an optimum combination of the modulation type and the carrier frequency can be selected for the system from the viewpoint of noise, vibration, efficiency and the like.

The inverter controller for driving a motor according to this embodiment can be also applied to both cases that a speed sensor such as a pulse generator cannot be used as in a compressor driving motor in an air conditioner, and that the speed sensor can be used as in a servo driver.

An inverter controller for driving a motor according to a second embodiment will be described. In particular, a configuration will be described below in which a protection operation is appropriately done even if there are variations in the operating voltage of the overvoltage protector.

Figure 3:
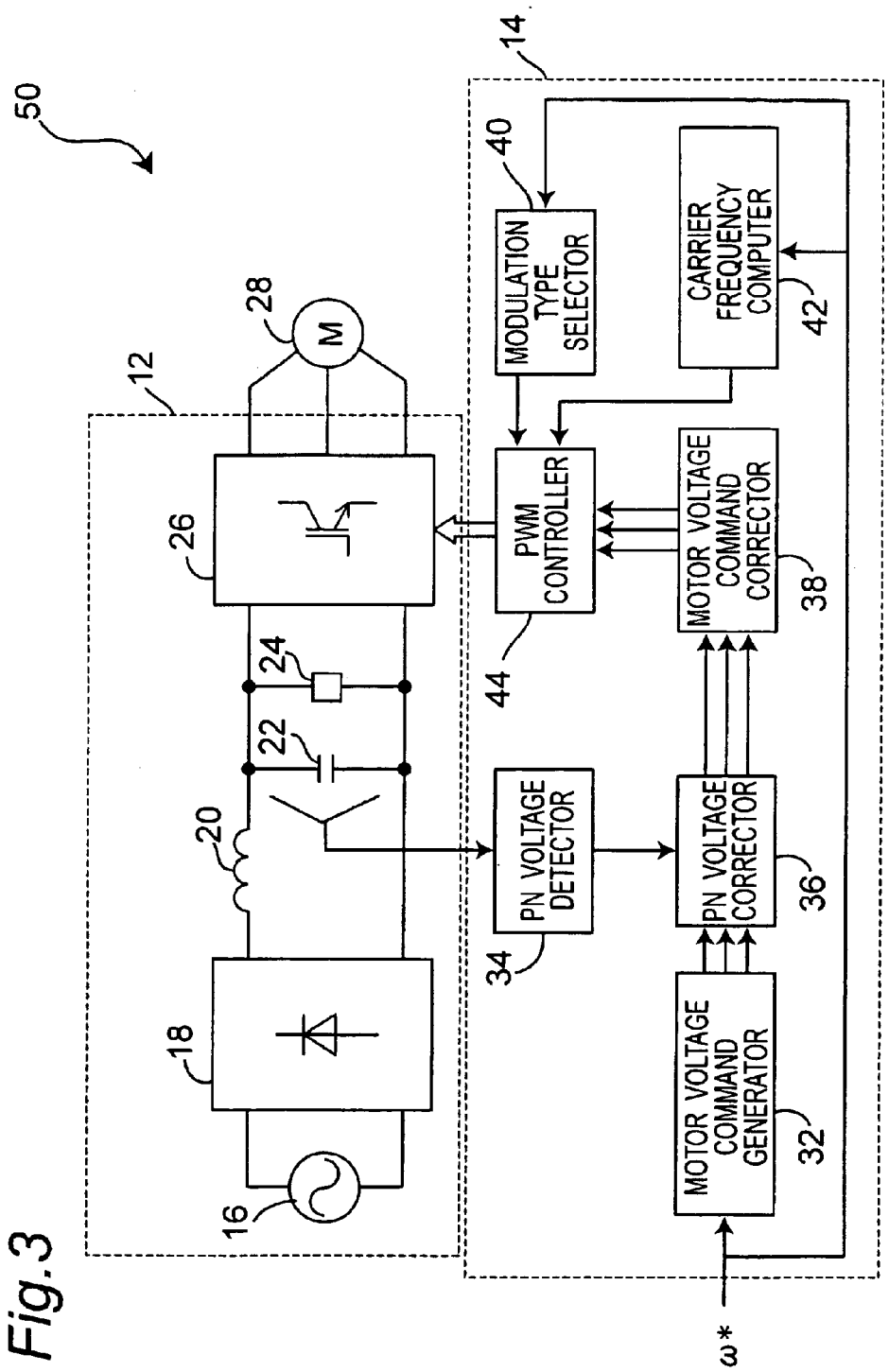
FIG. 3 is a diagram of an inverter controller for driving the motor according to a second embodiment of the present invention.

FIG. 3 shows a configuration of the inverter controller for driving a motor according to the second embodiment of the present invention. The main circuit 12 of the inverter controller 50 according to this embodiment is identical with that of the inverter controller according to the first embodiment.

On the other hand, the control circuit 14 of the inverter controller 50 according to this embodiment differs from that of the inverter controller 10 according to the first embodiment in that the modulation type selector 40 selects the modulation type on the basis of the motor speed command value ω* given from outside of the inverter controller 50, and that the carrier frequency computer 42 computes the carrier frequency on the basis of the motor speed command value ω* given from outside of the inverter controller 50.

In the inverter controller 50 for driving a motor according to this embodiment, electric energy accumulated in the capacitor 22 is small. Thus, charging and discharging are repeated at the carrier frequency of the inverter 26, and carrier frequency ripple appears in the voltage between DC buses of the inverter 26 (hereinafter, referred to as "inverter DC voltage").

FIGS. 4 to 7 are graphs showing that the inverter DC voltage varies with the combination of the modulation type and the carrier frequency. In each graph, the horizontal axis denotes time, and the vertical axis denotes the inverter DC voltage. In all cases, the reactor 20 has an inductance of 1 mH, the capacitor 22 has a capacitance of 5 $\mu$F, the AC power source voltage is 250V (50 Hz), the inverter operating frequency is 120 Hz (herein, the number of poles of the motor is two, so that the inverter operating frequency equals to the motor speed command value), and the output power of the AC power source 16 is 3000 W.

Figure 4:
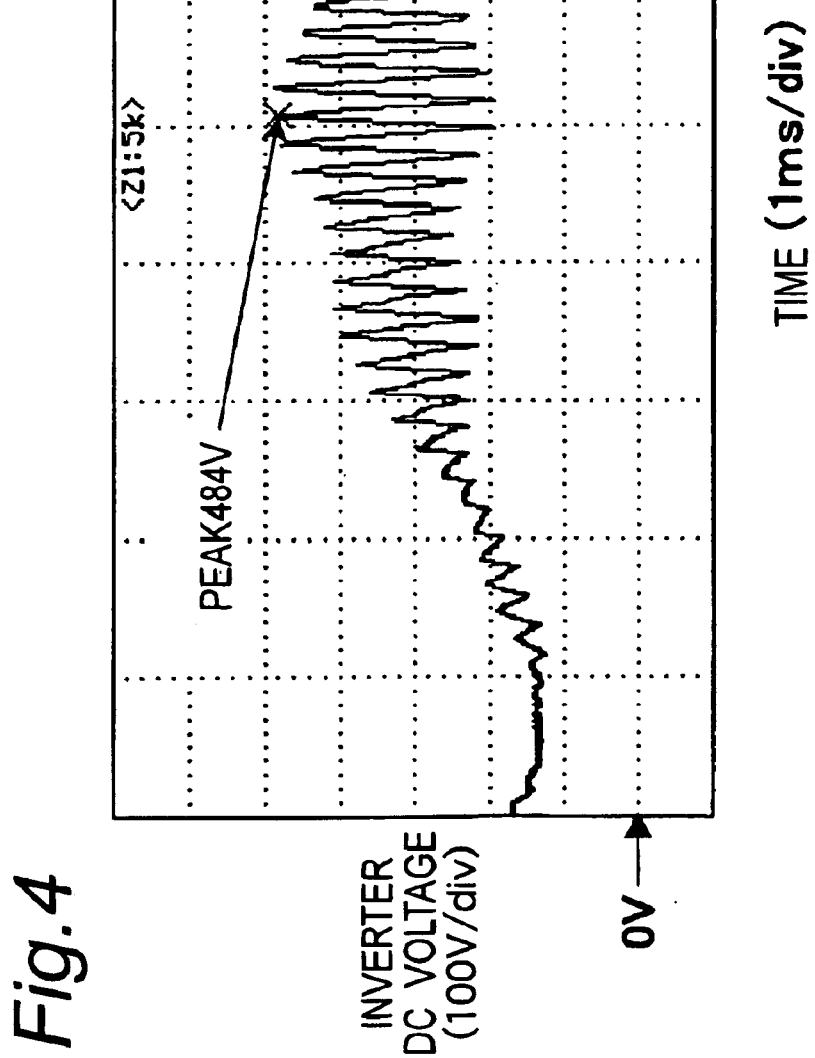
FIG. 4 is a diagram showing an example of an operation result of the inverter controller of FIG. 3.
Figure 5:
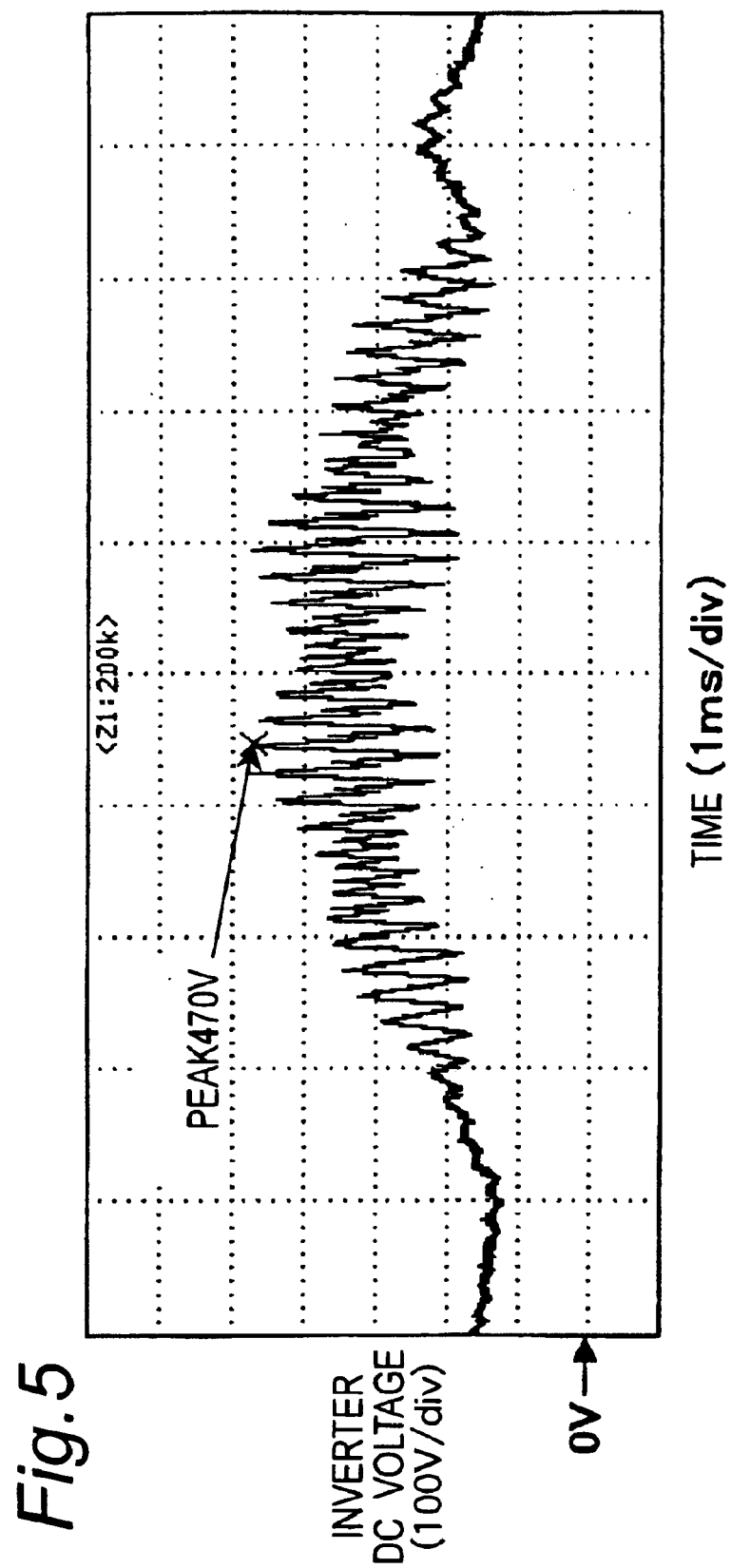
FIG. 5 is a diagram showing another example of the operation result of the inverter controller of FIG. 3.
Figure 6:
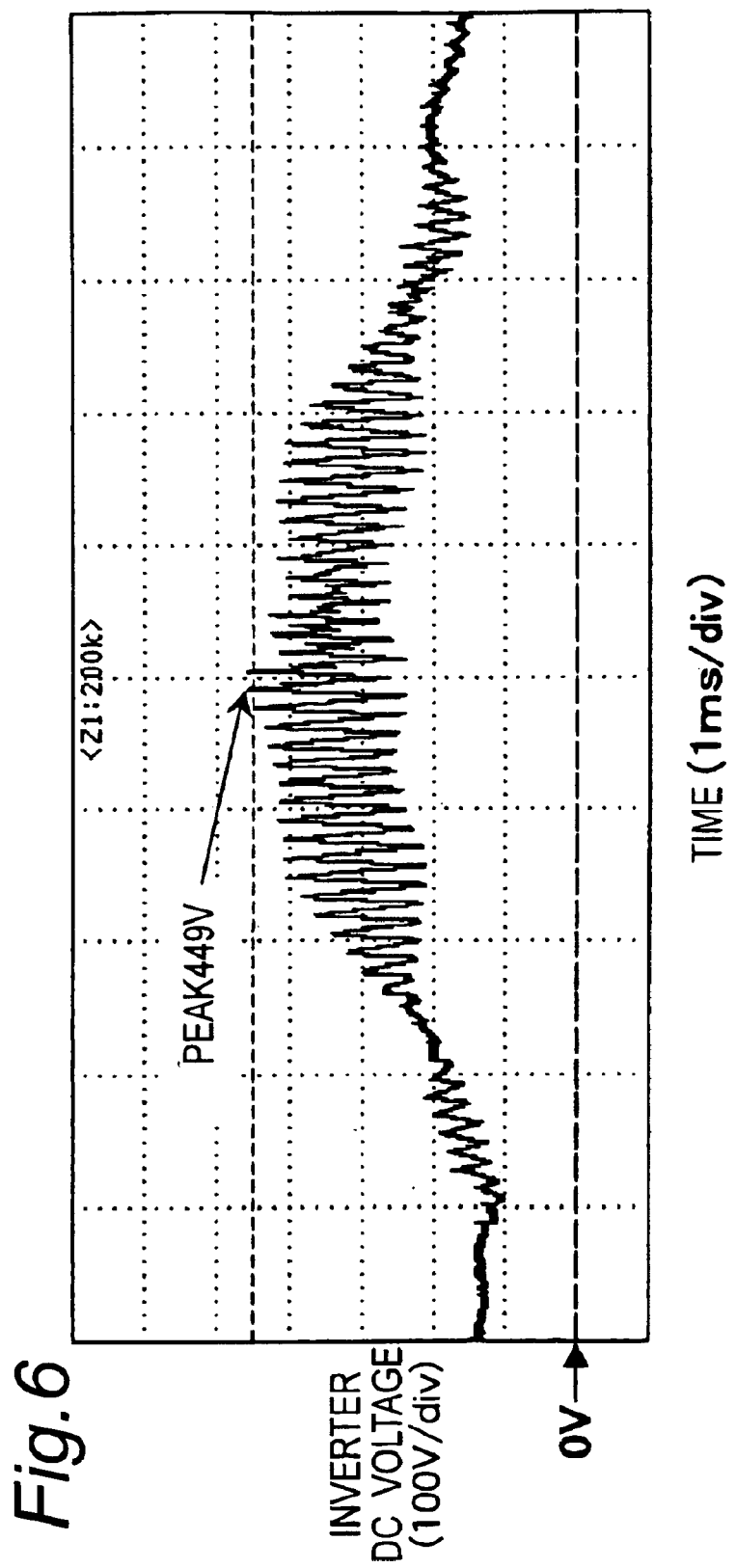
FIG. 6 is a diagram showing still another example of the operation result of the inverter controller of FIG. 3.
Figure 7:
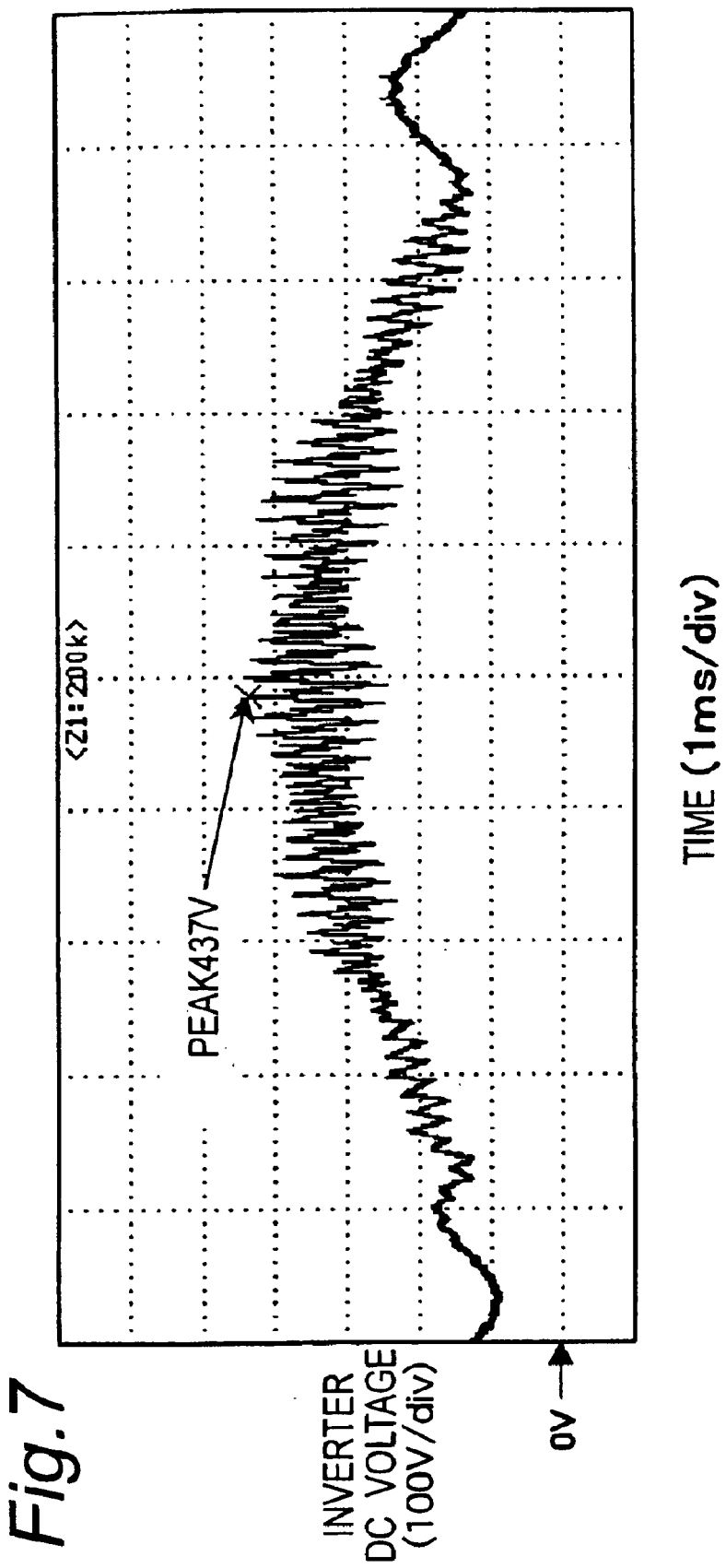
FIG. 7 is a diagram showing yet another example of the operation result of the inverter controller of FIG. 3.

FIG. 4 shows the inverter DC voltage in the case of the modulation type of the two-phase modulation and the carrier frequency of 5 kHz. As shown in FIG. 4, a peak value of the inverter DC voltage is 484V. FIG. 5 shows the inverter DC voltage in the case of the modulation type of the three-phase modulation and the carrier frequency of 5 kHz. As shown in FIG. 5, a peak value of the inverter DC voltage is 470 V. FIG. 6 shows the inverter DC voltage in the case of the modulation type of the two-phase modulation and the carrier frequency of 7 kHz. As shown in FIG. 6, a peak value of the inverter DC voltage is 449 V. FIG. 7 shows the inverter DC voltage in the case of the modulation type of the three-phase modulation and the carrier frequency of 7 kHz. As shown in FIG. 7, a peak value of the inverter DC voltage is 437 V.

As shown in FIGS. 4 to 7, the inverter DC voltage varies depending on the modulation type and the carrier frequency in PWM control. More particularly, fluctuations in the inverter DC voltage are larger when the two-phase modulation is selected rather than the three-phase modulation, and are larger when the lower carrier frequency is selected.

Hereinafter, an operation of the overvoltage protector 24 will be described. When the with stand voltage of the inverter 26 and/or the capacitor 22 is, for example, 600 V, the overvoltage protector 24 generally may start a protection operation when the inverter DC voltage becomes about 550 V. However, in some cases, the overvoltage protector 24 starts the protection operation at the inverter DC voltage of 550 V or less, due to the fluctuations in a voltage at which it starts the protection operation (referred to as "an operating voltage of the overvoltage protector"). For example, if the operating voltage of the overvoltage protector 24 has variations of ±10%, when it is set to start the protection operation at the inverter DC voltage of 500 V in a standard product, it can start the protection operation at the inverter DC voltage of maximum 550 V or minimum 450 V.

In this case, supposing that the overvoltage protector 24 started the protection operation at the inverter DC voltage of 450 V, when the combination of the modulation type and carrier frequency shown in FIGS. 4 and 5 is used, the inverter controller fails to operate. When that shown in FIG. 6 is used, a system of the inverter controller is too narrow in margin of allowance. When that shown in FIG. 7 is always used during the operation of the inverter controller, that is, the carrier frequency is set to be low while the three-phase modulation is employed, switching loss in the inverter is too large.

Figure 8:
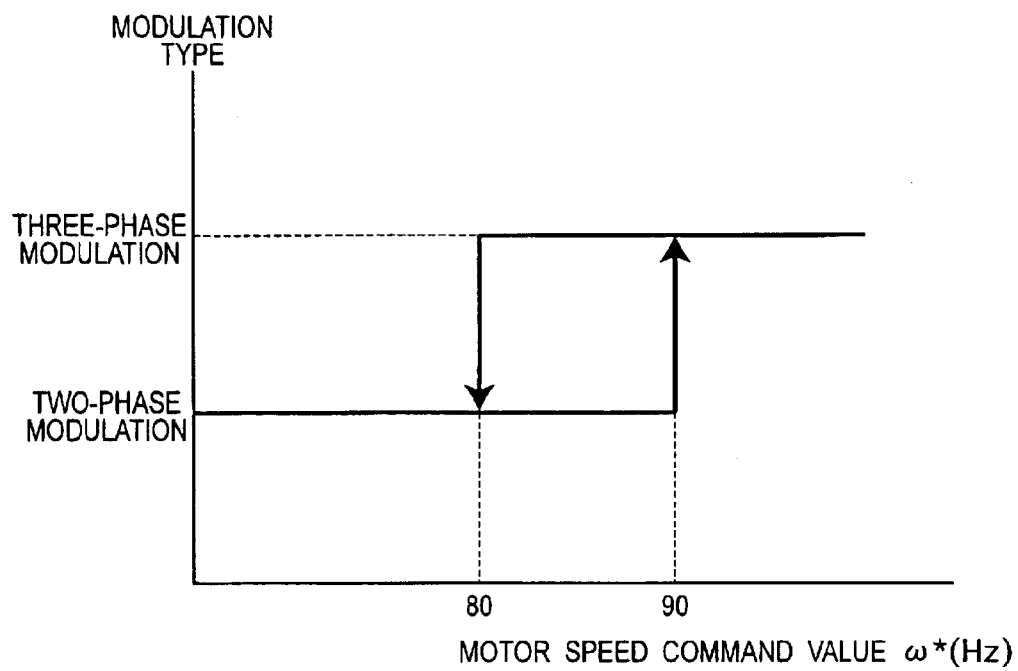
FIG. 8 is a diagram to explain a method of selecting a modulation type by a modulation type selector of the inverter controller of FIG. 3.

The inverter controller for driving a motor according to this embodiment selects the modulation type and the carrier frequency on the basis of the motor speed command value ω* given from outside of the inverter controller as described below. FIG. 8 is a graph to explain a method of selecting the modulation type by the modulation type selector 40. In the graph of FIG. 8, the horizontal axis denotes the motor speed command value ω* and the vertical axis denotes the modulation type. As shown in FIG. 8, if the motor speed command value ω* varies from 80 to 90 Hz, when the two-phase modulation has been selected at the time when the motor speed command value ω* of 80 Hz is given, it switches to the three-phase modulation at the time when the motor speed command value ω* of 90 Hz is given. Similarly, if the motor speed command value ω* varies from 90 Hz to 80 Hz, when the three-phase modulation has been selected at the time when the motor speed command value ω* of 90 Hz is given, it switches to the two-phase modulation at the time when the motor speed command value ω* of 80 Hz is given.

Figure 9:
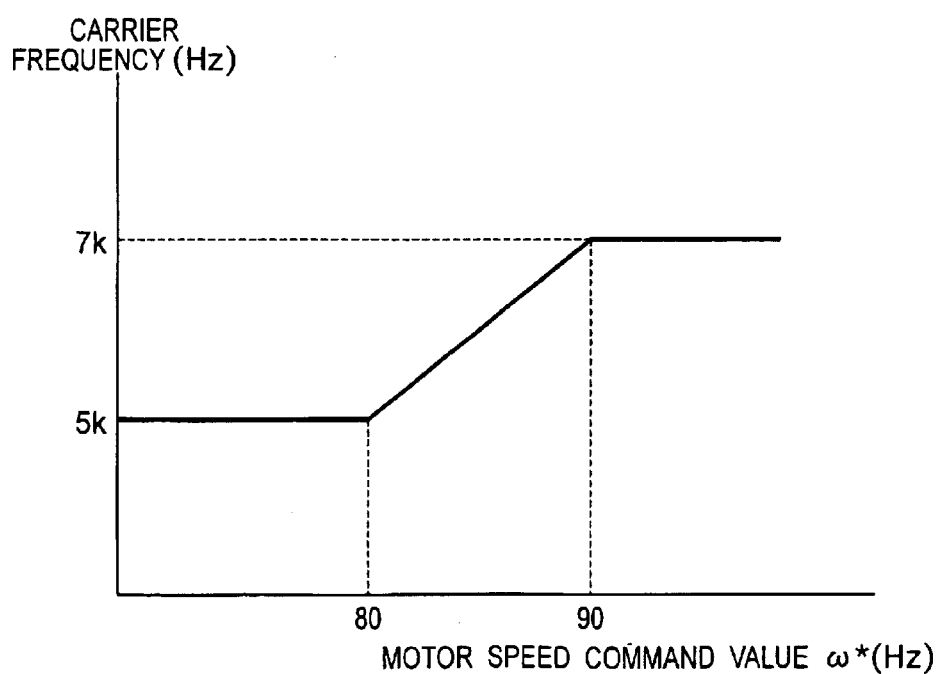
FIG. 9 is a diagram to explain a method of calculating a carrier frequency in a carrier frequency computer of the inverter controller of FIG. 3.

FIG. 9 is a graph to explain a method of selecting the carrier frequency by the carrier frequency computer 42. In the graph of FIG. 9, the horizontal axis denotes the motor speed command value ω* and the vertical axis denotes the carrier frequency. As shown in FIG. 9, when the motor speed command value ω* is 80 Hz or less, the carrier frequency of 5 kHz is selected. When the motor speed command value ω* is 90 Hz or more, the carrier frequency of 7 kHz is selected. When the motor speed command value ω* is somewhere between 80 Hz and 90 Hz, the carrier frequency is selected in proportion to the motor speed command value ω*.

If the method of selecting the modulation type shown in FIG. 8 and that of selecting the carrier frequency shown in FIG. 9 are employed, when the motor speed command value ω* is large, for example, 120 Hz, the three-phase modulation and the carrier frequency of 7 kHz are selected, and the inverter 26 is PWM controlled under these conditions. In this case, the peak value of the inverter DC voltage is 437 V as shown in FIG. 7, so that the protection operation is not executed by the overvoltage protector 24, even if the operating voltage of the overvoltage protector 24 has variations of ±10%. As a result, the operation of the inverter controller is enabled, even if the operating voltage of the overvoltage protector 24 has variations of ±10%.

As described above, the inverter controller for driving a motor according to this embodiment selects the two-phase modulation and low carrier frequency in the ordinary operating region near the rating of the system. Then, when the motor rotates at high speed and its output torque is increased, it switches the modulation type from the two-phase to the three-phase and raises the carrier frequency in such a way that the range of the fluctuation in the inverter DC voltage is reduced. As a result, the inverter controller according to this present invention doesn't do the protection operation even in the situation in which a well-known inverter controller could have done it due to the fluctuations in the operating voltage of the overvoltage protector, and the motor can operate continuously. That is, even if the operating voltage of the overvoltage protector has variations, the motor operating region can be kept large.

Further, the inverter controller for driving a motor according to this embodiment selects the two-phase modulation and sets the carrier frequency low in the ordinary operating region near the rating of the system, so that the switching loss of the inverter is decreased and a high efficient system of the inverter controller is realized.

The inverter controller for driving a motor according to this embodiment has the same effects as that according to the first embodiment.

When the fluctuations in the operating voltage of the overvoltage protector 24 are small, it is evidently sufficient to select at least one of switching of the modulation type by the modulation type selector 40 and changeover in the carrier frequency by the carrier frequency computer 42.

An inverter controller for driving a motor according to a third embodiment will be described. Same as in the second embodiment, the configuration will be described below in which a protection operation is appropriately done even if there are variations in the operating voltage of the overvoltage protector. The inverter controller for driving a motor according to this embodiment differs from that according to the second embodiment in that the modulation type selector and the carrier frequency computer select the modulation type and the carrier frequency, respectively, on the basis of the inverter DC voltage detected by the PN voltage detector 34, instead of the motor speed command value ω* given from outside of the inverter controller.

Figure 10:
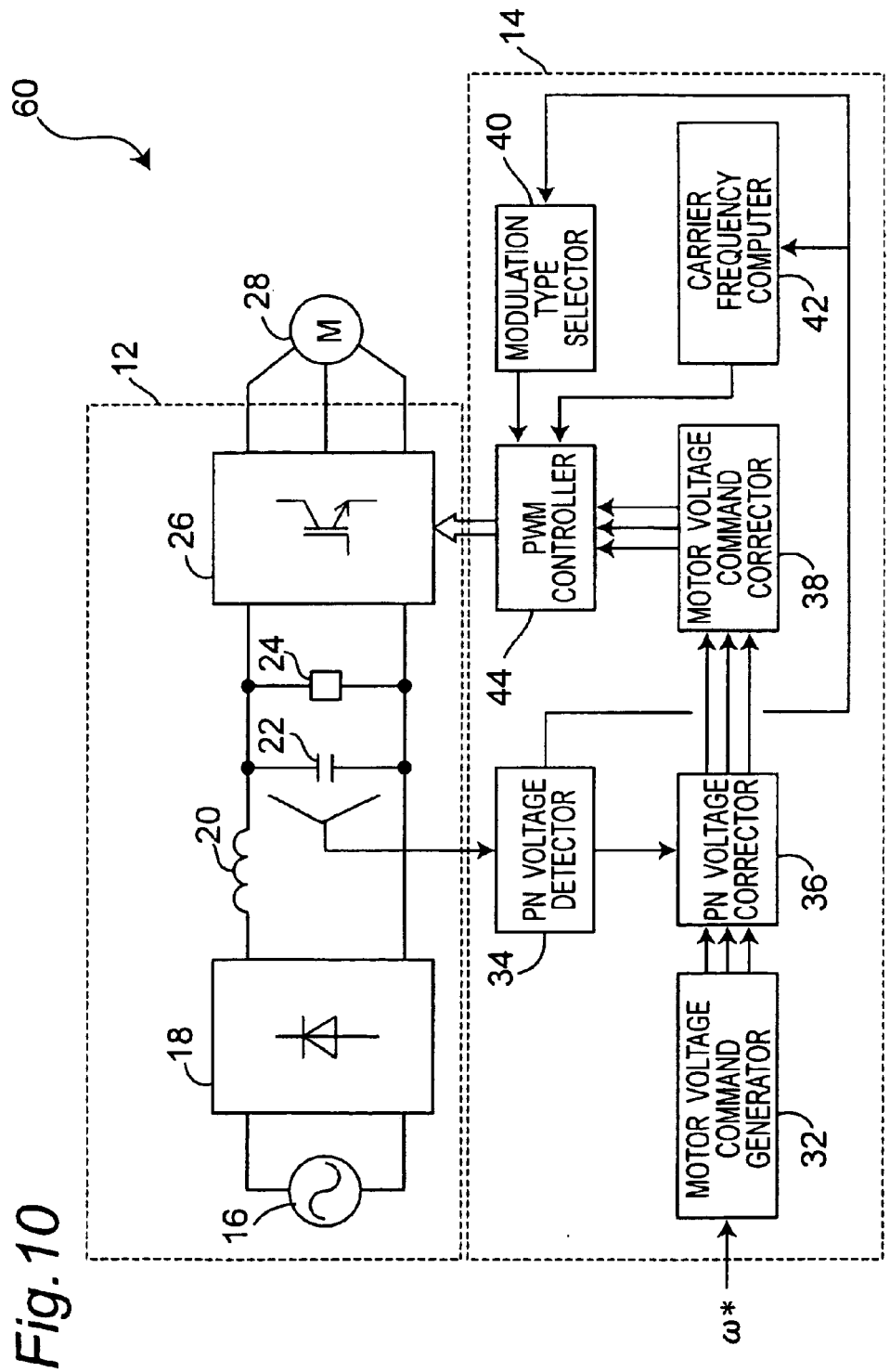
FIG. 10 is a diagram of an inverter controller for driving the motor according to a third embodiment of the present invention.

FIG. 10 shows a configuration of the inverter controller for driving a motor according to the third embodiment. The main circuit 12 of the inverter controller 60 according to this embodiment is identical with that of the inverter controller 50 according to the second embodiment.

On the other hand, the control circuit 14 of the inverter controller 60 for driving the motor according to the third embodiment differs from that of the inverter controller 50 for driving the motor according to the second embodiment in that the modulation type selector 40 selects either two-phase modulation or three-phase modulation as the modulation type on the basis of the value of the inverter DC voltage detected by the PN voltage detector 34, and that the carrier frequency computer 42 calculates the carrier frequency on the basis of the value of the inverter DC voltage detected.

Figure 11:
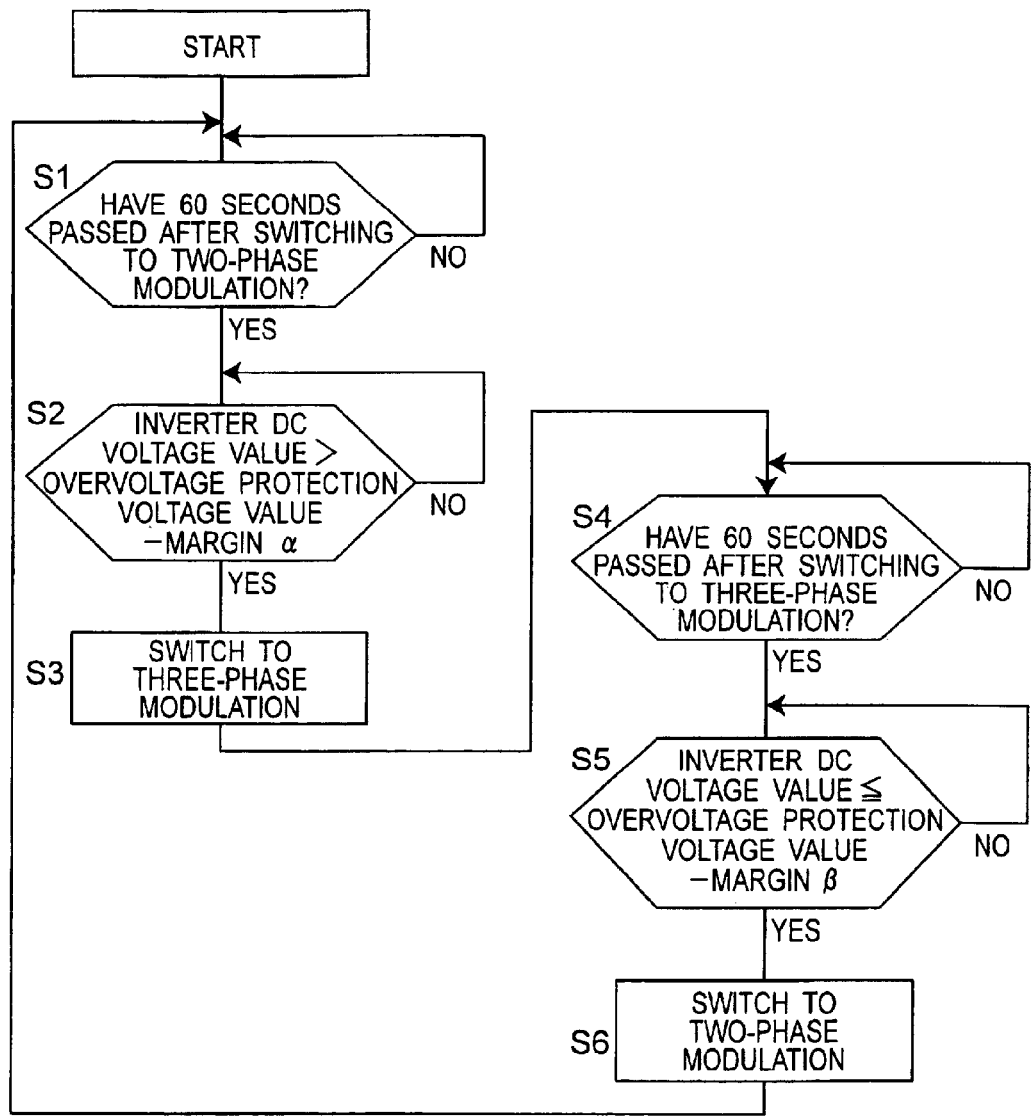
FIG. 11 is a diagram to explain a method of selecting a modulation type by a modulation type selector of the inverter controller of FIG. 10.

FIG. 11 is a flowchart to explain a method of selecting the modulation type by the modulation type selector 40. In the method as shown in FIG. 11, for example, the two-phase modulation is first selected. After switching to the two-phase modulation, it is checked if 60 seconds have passed or not (step S1) since the modulation type is switched to the two-phase modulation. If 60 seconds having not passed, the two-phase modulation is maintained until 60 seconds have passed. If they have already passed, the value of the inverter DC voltage detected by the PN voltage detector 34 is compared with the result (hereinafter, referred to as "first voltage value") of subtracting a certain margin (α) from a value of the operating voltage of the overvoltage protector 24 (hereinafter, referred to as "overvoltage protection voltage value") (step S2). When the value of the inverter DC voltage (inverter DC voltage value) equals to the first voltage value or less, the modulation type remains at the two-phase modulation. When the inverter DC voltage value exceeds the overvoltage protection voltage value, the modulation type is switched from the two-phase modulation to three-phase modulation (step S3). When the modulation type is switched from the two-phase modulation to three-phase modulation, the three-phase modulation is maintained for 60 seconds after switching to the three-phase modulation (step S4). After 60 seconds having passed, the inverter DC voltage value is compared with the result (hereinafter, referred to as "second voltage value") of subtracting a certain margin (β), which is larger than the margin (α), from the overvoltage protection voltage value (step S5). When the inverter DC voltage value is larger than the second voltage value, the modulation type remains at the three-phase modulation. When the inverter DC voltage value equals to the second voltage value or less, the modulation type is switched from the three-phase modulation to the two-phase modulation (step S6).

Herein, after switching the modulation type, the same modulation type is maintained for 60 seconds, because this is necessary to prevent hunting (self-oscillation) of switching of the modulation type.

Figure 12:
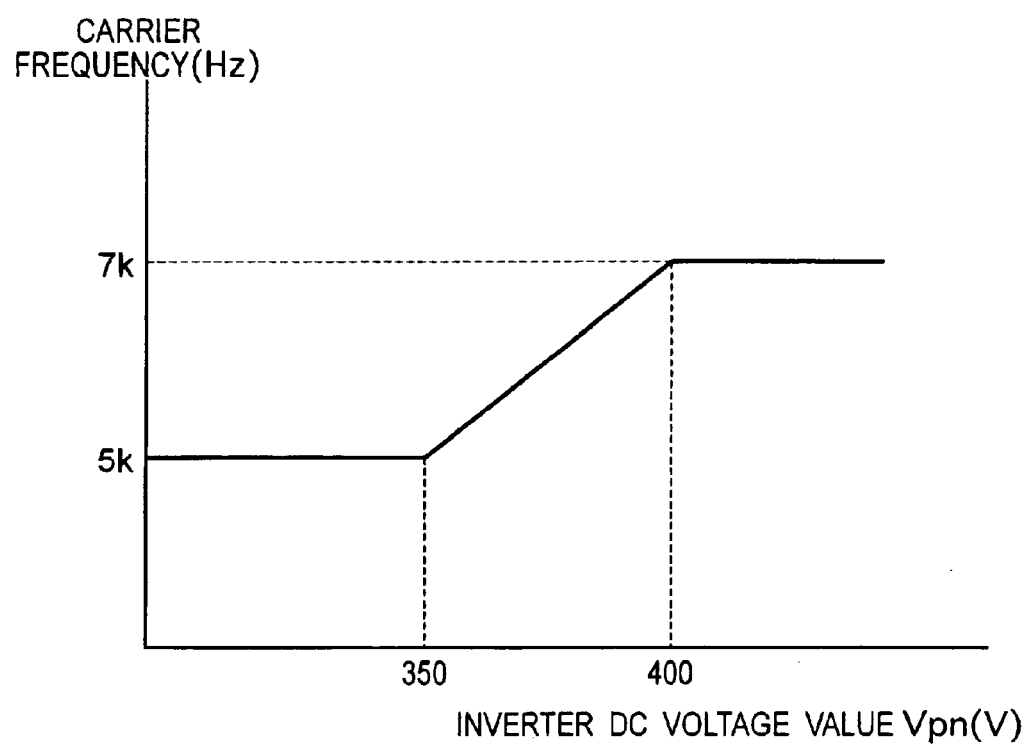
FIG. 12 is a diagram to explain a method of calculating a carrier frequency by a carrier frequency computer of the inverter controller of FIG. 10.

FIG. 12 is a diagram to explain a method of selecting the carrier frequency by the carrier frequency computer 42. In the graph of FIG. 12, the horizontal axis denotes the inverter DC voltage value and the vertical axis denotes the carrier frequency. As shown in FIG. 12, when the inverter DC voltage value is 350 V or less, the carrier frequency of 5 kHz is selected. When the inverter DC voltage value is somewhere between 350 V and 400V, the carrier frequency in proportion to the inverter DC voltage value is selected. When the inverter DC voltage value is 400 V or more, the carrier frequency of 7 kHz is selected.

The inverter controller for driving a motor according to this embodiment has the same effects as that according to the second embodiment, that is, even if the operating voltage of the overvoltage protector fluctuates, the overvoltage protector doesn't start the protection operation, so that the motor operating region can be kept large. Further, the reliability of the operation of the motor is enhanced, since the motor is controlled on the basis of the actual inverter DC voltage value.

When the fluctuations of the operating voltage of the overvoltage protector 24 are small, it is evidently sufficient to select at least one of switching of the modulation type by the modulation type selector 40 and changeover in the carrier frequency by the carrier frequency computer 42.

It will be described about a method of setting an inverter operating frequency in the inverter controllers for driving a motor according to the first to third embodiments. Hereinafter, supposing that the motor has two poles, and the inverter operating frequency and the motor speed command value are equal to each other.

Figure 13:
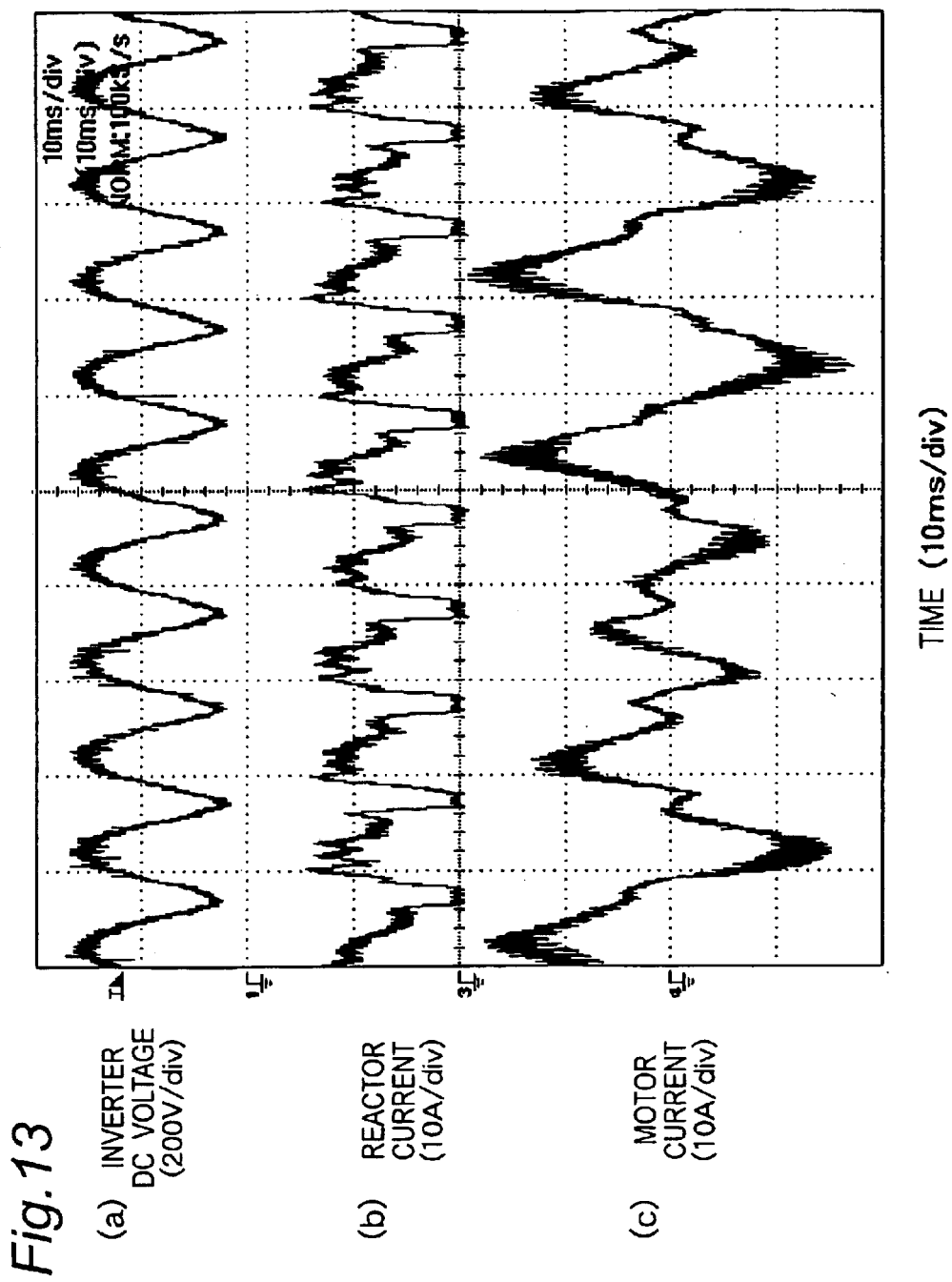
FIG. 13 is a diagram showing an example of the operation result of the inverter controller for driving a motor according to the present invention, in which (a) is a waveform of an inverter DC voltage, (b) is a waveform of a reactor current, and (c) is a waveform of a motor current.

FIG. 13 is a waveform to explain the operation of the inverter controller for driving a motor-according to the present invention. In FIG. 13, (a) shows a waveform of an inverter DC voltage, (b) shows a waveform of a reactor current, and (c) shows a waveform of a motor current.

As shown in (a) to (c) of FIG. 13, the inverter DC voltage pulsates largely at the frequency twice the AC power source frequency $f_s$, since the capacitor having a small capacitance is used in the inverter controller for driving a motor according to the present invention.

Accordingly, when the inverter operating frequency $f_1$ is even number times the AC power source frequency $f_s$, the inverter operating frequency $f_1$ is synchronized with the pulsating frequency of the inverter DC voltage (that is, a frequency twice the AC power source frequency $f_s$), so that resonance phenomenon occurs.

Figure 14:
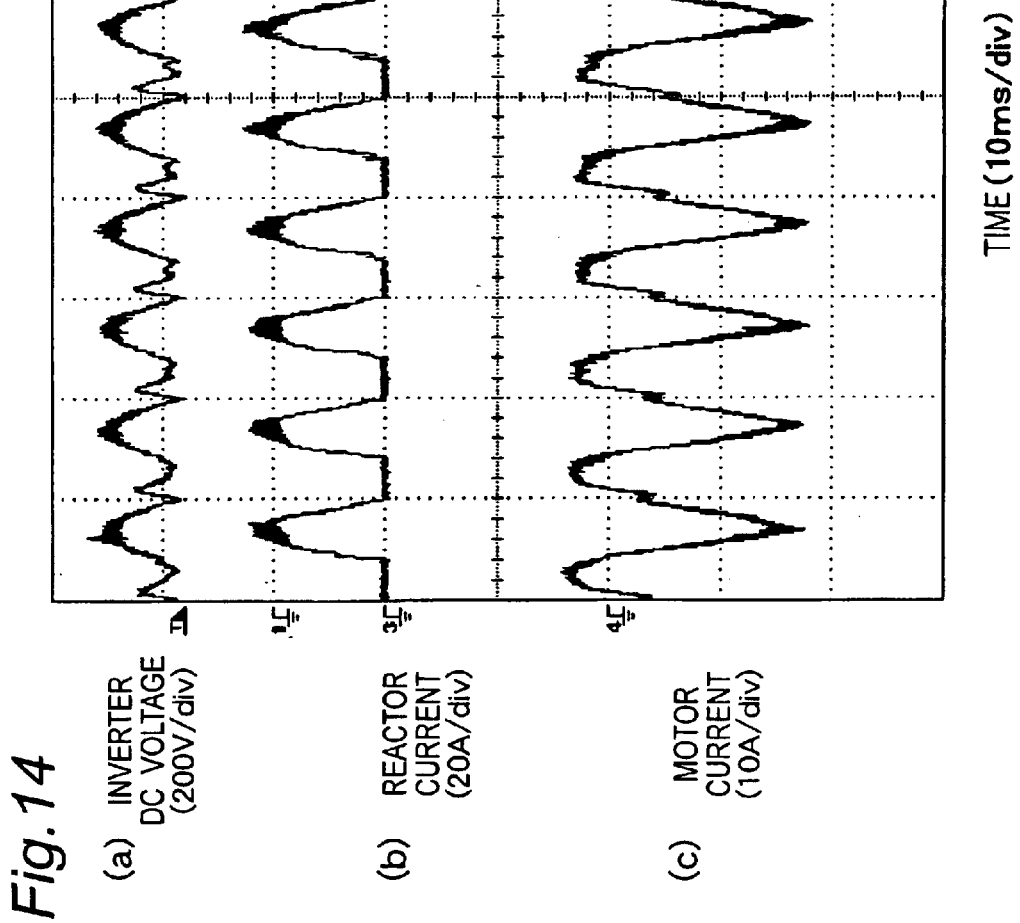
FIG. 14 is a diagram showing an another example of the operation result of the inverter controller for driving a motor according to the present invention, in which (a) is a waveform of an inverter DC voltage, (b) is a waveform of a reactor current, and (c) is a waveform of a motor current.

FIG. 14 is a waveform to explain the operation of the inverter controller for driving a motor when the inverter operating frequency $f_1$ is twice the AC power source frequency $f_s$. In FIG. 14, (a) shows a waveform of the inverter DC voltage, (b) shows a waveform of the reactor current and (c) shows a waveform of the motor current. Here, the inductance of the reactor 20 is 0.5 mH, the capacitance of the capacitor 22 is 10 μF, the AC power source is 220 V (50 Hz), the inverter operating frequency is 100 Hz, and the inverter carrier frequency is 5 kHz.

As shown in (a) to (c) of FIG. 14, when the inverter operating frequency $f_1$ is two times the AC power source frequency $f_s$, the inverter operating frequency $f_1$ is synchronized with the pulsating frequency of the inverter DC voltage, so that resonance phenomenon occurs, and a negative DC component is superposed on the motor current. As a result, brake torque occurs in the motor 28, which causes adverse effects such as decrease of output torque and increase of motor loss.

Thus, in setting the inverter operating frequency $f_1$, it is required to avoid stationary fixing of the inverter operating frequency $f_1$ as given by Eqs. (6).

$$f_1 = 2nf_s \pm \Delta f, \quad (6)$$

where n is an integer, and Δf is a predetermined frequency width, and the frequency width Δf is basically set so as to minimize an effect of the resonance phenomenon.

Further, if the inverter operating frequency $f_1$ exceeds the resonance frequency as given by Eqs. (6), the inverter operating frequency $f_1$ is changed instantly in a transient state by acceleration or deceleration, thereby avoiding fixing at the resonance frequency.

It is not always necessary to set the frequency width Δf, and it may not be set in some operation status (such as light load) (in this case, the Equation Δf=0 may hold).

As described above, by avoiding the resonance phenomenon determined by the inverter operating frequency and AC power source frequency, the unstable operation of the motor is prevented, and stable driving of it is realized.

Hereinafter, it will be described about a method of determining the capacitance of the capacitor 22 and the inductance of the reactor 20 in the inverter controllers for driving the motor described in the first to third embodiments.

In the inverter controller for driving a motor according to the present invention, the combination of the capacitor 22 and the reactor 20 is determined so that resonance frequency $f_{LC}$ (LC resonance frequency), which is determined by a capacitance of the capacitor 22 and an inductance of the reactor 20, may be 40 times larger than the AC power source frequency $f_s$ in order to satisfy the IEC standard by suppressing the harmonic components of the AC power source current.

Supposing the capacitance of the capacitor 22 to be C [F] and the inductance of the reactor 20 to be L [H], the LC resonance frequency $f_{LC}$ may be given by Eqs. (7).

$$f_{LC} = \frac{1}{2\pi\sqrt{LC}}. \quad (7)$$

That is, the combination of the capacitor 22 and the reactor 20 is determined so as to satisfy $f_{LC} > 40f_s$. This is based on the fact that higher harmonics up to degree 40 are specified as harmonic components of AC power source current in the IEC standard.

According to this configuration, the harmonic components of the AC power source current are suppressed, so that the IEC standard can be satisfied.

Figure 15:
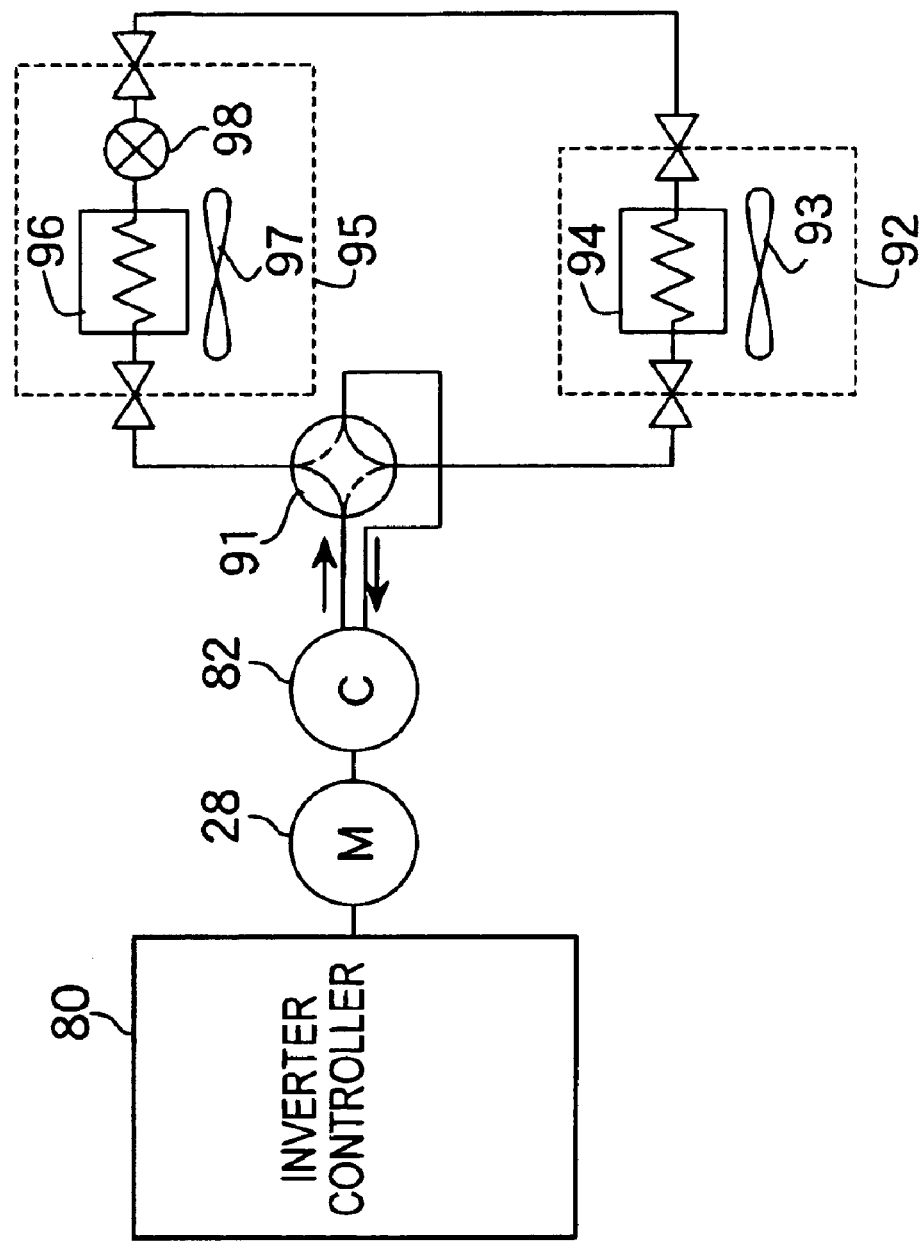
FIG. 15 is a block diagram of an air conditioner using the inverter controller for driving a motor according to the present invention.
Figure 16:
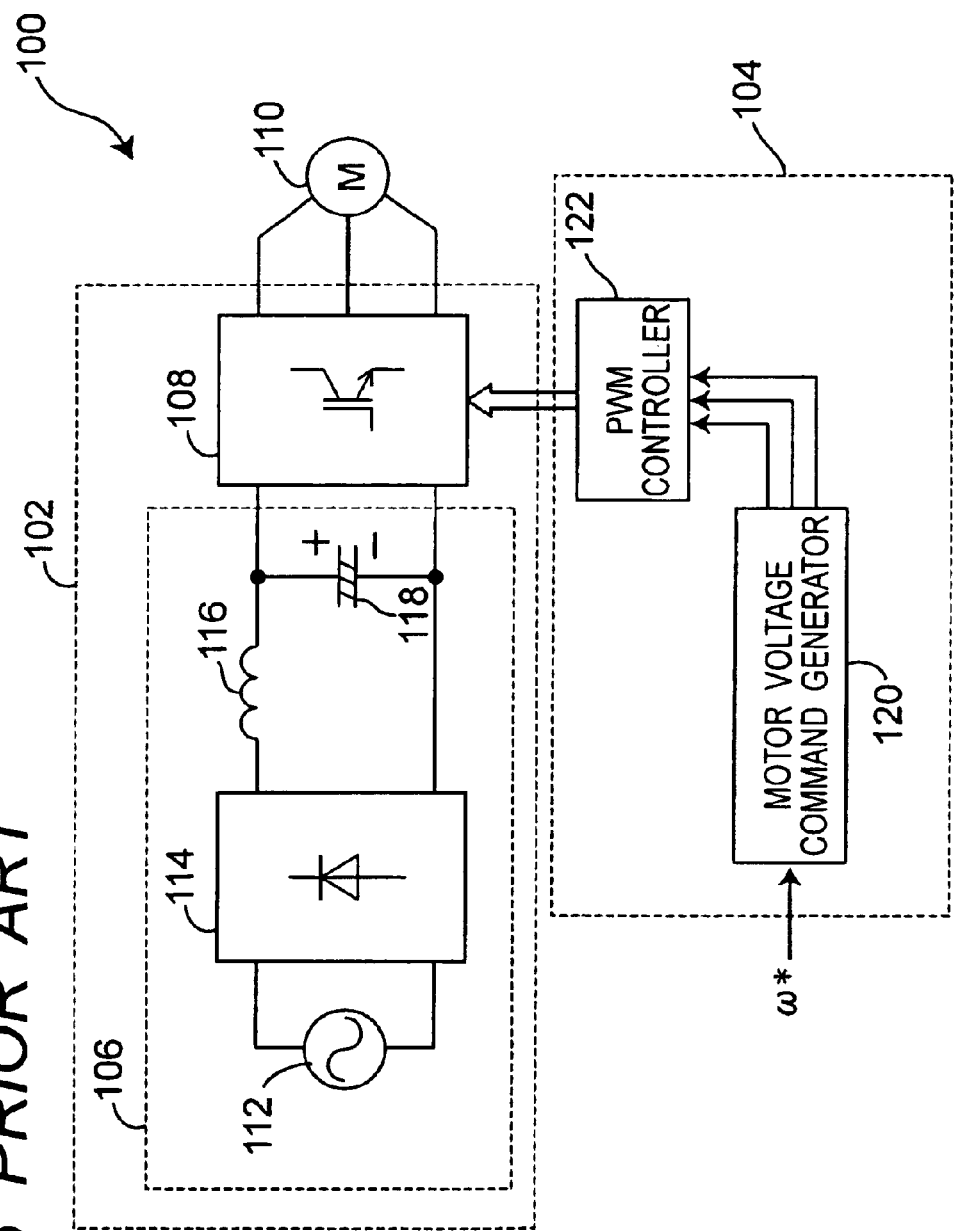
FIG. 16 is a diagram of a conventional inverter controller for driving the motor.
Figure 17:
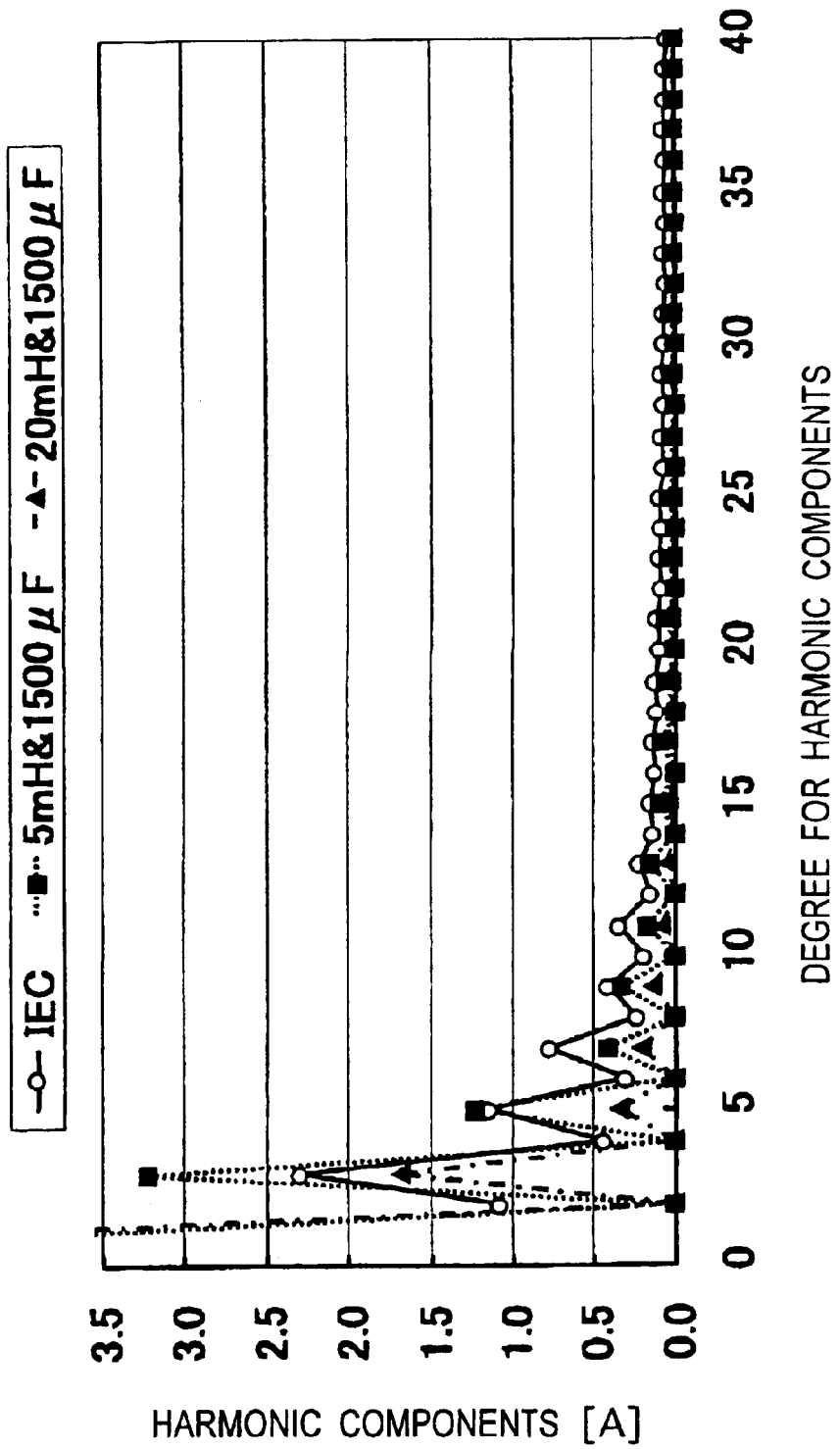
FIG. 17 is a diagram showing the relation between harmonic components of AC power source current and the degree of the harmonic components in a conventional inverter controller for driving the motor.
Figure 18:
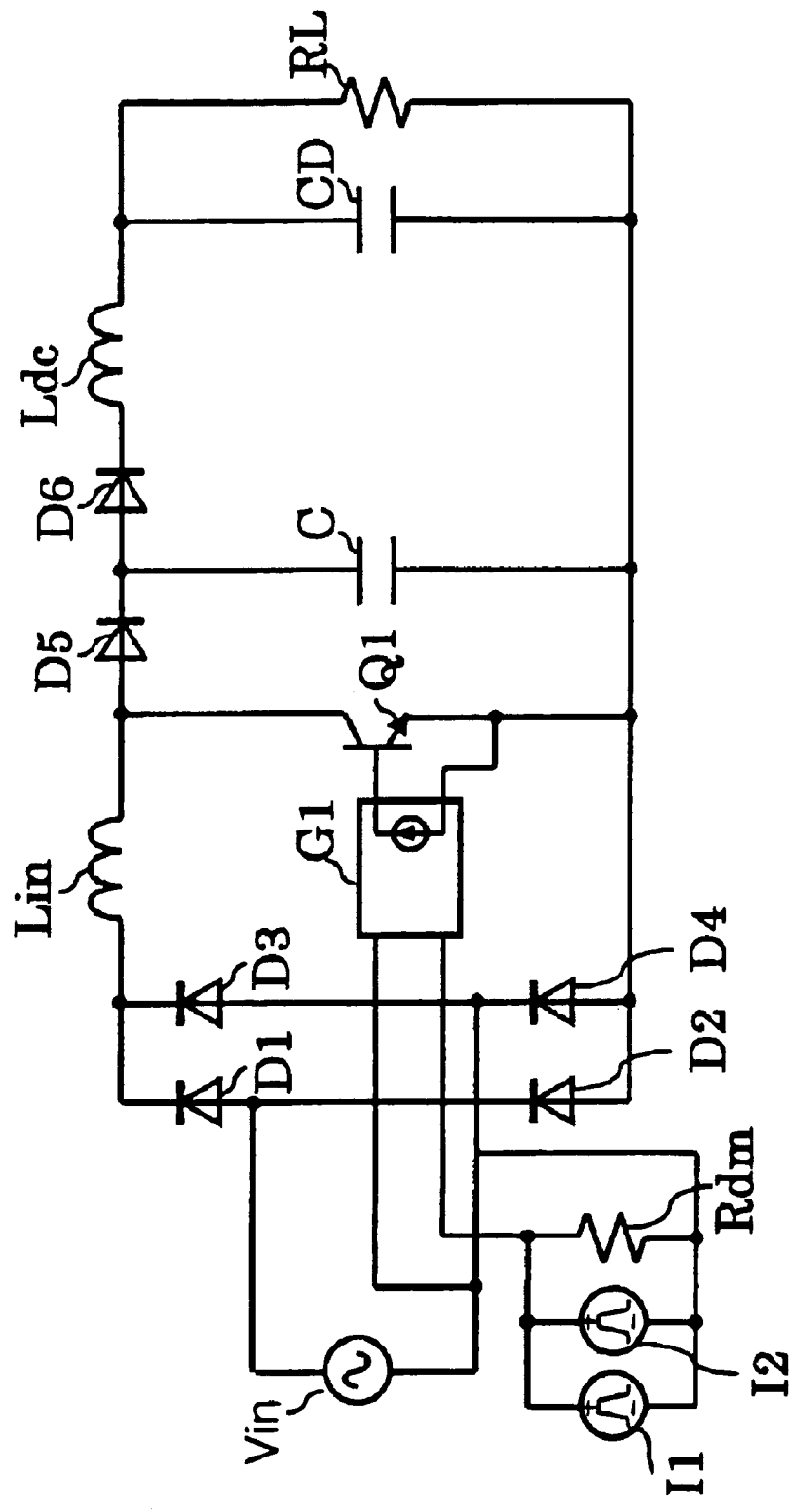
FIG. 18 is a circuit diagram of a conventional DC power supply unit.

FIG. 15 shows a configuration of an air conditioner using the inverter controller for driving a motor described in the foregoing embodiments. As shown in FIG. 15, the air conditioner uses the inverter controller 80, and further includes a motor-driven compressor 82, and a refrigeration cycle consisting of an indoor unit 92, an outdoor unit 95, and a four-way valve 91. The indoor unit 92 includes an indoor blower 93 and an indoor heat exchanger 94, while the outdoor unit 95 includes an outdoor heat exchanger 96, an outdoor blower 97 and an expansion valve 98. The motor-driven compressor 82 is driven by a motor 28, and the motor 28 is driven by the inverter controller 80. In the refrigeration cycle, heat medium, that is, a refrigerant circulates. The refrigerant is compressed by the motor-driven compressor 82, is exchanged in heat with the outdoor air by the air blow from the outdoor blower 97 by means of the outdoor heat exchanger 96, and is further exchanged in heat with the indoor air by the air blow from the indoor blower 93 by means of the indoor heat exchanger 94.

It will be obvious to those having skill in the art that many changes may be made in the above-described details of the preferred embodiments of the present invention. The scope of the present invention, therefore, should be determined by the following claims.

What is claimed is:

1. An inverter controller for driving a motor comprising:
    a rectifier connected to an AC power source, said rectifier including
        a diode bridge; and
        a reactor which has a predetermined inductance, said reactor being connected to an input or an output side of said diode bridge;
    an inverter which converts a DC power received from said rectifier into an AC power to supply the AC power to the motor;
    a capacitor which has a predetermined capacitance, said capacitor being connected between DC buses of said inverter;
    a generator which generates a voltage command value for each phase of the motor on the basis of a motor speed command value received from outside of said inverter controller;
    a detector which detects a DC voltage between the DC buses of said inverter;
    a first corrector which calculates a voltage correction coefficient by comparing the DC voltage received from said detector with a predetermined DC reference voltage;
    a second corrector which corrects the voltage command value for each phase of the motor by multiplying the voltage command value and the voltage correction coefficient;
    a selector which selects either two-phase modulation or three-phase modulation as a modulation type used in pulse width modulation control of said inverter;
    a computer that computes a carrier frequency used in the pulse width modulation control of said inverter; and
    a pulse width modulation controller that controls a pulse width modulation so that a value of a voltage to be applied to the motor equals the voltage command value corrected by said second corrector, by using the modulation type selected by said selector and the carrier frequency computed by said computer.

2. The inverter controller for driving a motor according to claim 1, further comprising an overvoltage protector connected in parallel to said capacitor.

3. The inverter controller for driving a motor according to claim 2, wherein said selector switches between the two-phase modulation and the three-phase modulation on the basis of the motor speed command value received from outside of said inverter controller.

4. The inverter controller for driving a motor according to claim 2, wherein said computer changes the carrier frequency on the basis of the motor speed command value received from outside of said inverter controller.

5. The inverter controller for driving a motor according to claim 3, wherein said computer changes the carrier frequency on the basis of the motor speed command value received from outside of said inverter controller.

6. The inverter controller for driving a motor according to claim 2, wherein said selector switches between the two-phase modulation and the three-phase modulation on the basis of the DC voltage received from said detector.

7. The inverter controller for driving a motor according to claim 2, wherein said computer changes the carrier frequency on the basis of the DC voltage received from said detector.

8. The inverter controller for driving a motor according to claim 6, wherein said computer changes the carrier frequency on the basis of the DC voltage received from said detector.

9. The inverter controller for driving a motor according to claim 1, wherein an operating frequency of said inverter is prevented from being stationary fixed at a resonance frequency, which is an even number multiple of an AC power source frequency, and within a range of predetermined frequency region around the resonance frequency.

10. The inverter controller for driving a motor according to claim 1, wherein a combination of an inductance value of said reactor and a capacitance value of said capacitor is determined so that a resonance frequency determined by the inductance value and the capacitance value is larger than 40 times an AC power source frequency.

11. An air conditioner including the inverter controller for driving a motor comprising:
    a rectifier connected to an AC power source, said rectifier including
        a diode bridge; and
        a reactor which has a predetermined inductance, said reactor being connected to an input or an output side of said diode bridge;
    an inverter which converts a DC power received from said rectifier into an AC power to supply the AC power to the motor;
    a capacitor which has a predetermined capacitance, said capacitor being connected between DC buses of said inverter;
    a generator which generates a voltage command value for each phase of the motor on the basis of a motor speed command value received from outside of said inverter controller;
    a detector which detects a DC voltage between the DC buses of said inverter;
    a first corrector which calculates a voltage correction coefficient by comparing the DC voltage received from said detector with a predetermined DC reference voltage;
    a second corrector which corrects the voltage command value for each phase of the motor by multiplying the voltage command value and the voltage correction coefficient;
    a selector which selects either two-phase modulation or three-phase modulation as a modulation type used in pulse width modulation control of said inverter;
    a computer that computes a carrier frequency used in the pulse width modulation control of said inverter; and
    a pulse width modulation controller which controls a pulse width modulation so that a value of a voltage to be applied to the motor equals to the voltage command value corrected by said second corrector, by using the modulation type selected by said selector and the carrier frequency computed by said computer.

* * * * *